UNITED STATES PATENT OFFICE.

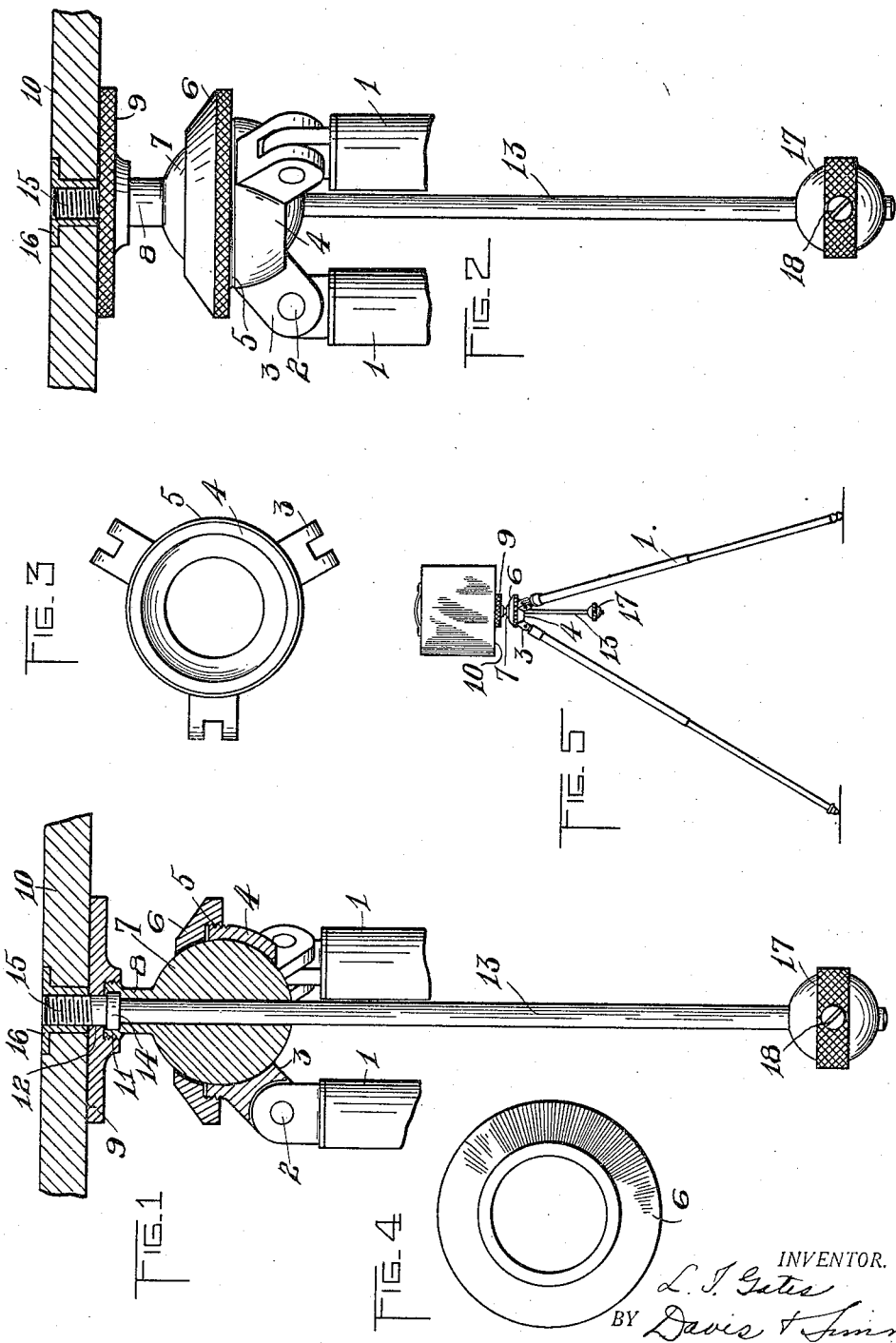

LINWOOD I. GATES, OF BARNARD, NEW YORK.

CAMERA-TRIPOD.

1,306,057.   Specification of Letters Patent.   Patented June 10, 1919.

Application filed January 18, 1919. Serial No. 271,859.

*To all whom it may concern:*

Be it known that I, LINWOOD I. GATES, a citizen of the United States, and resident of Barnard, in the county of Monroe and State of New York, have invented certain new and useful Improvements in Camera-Tripods, of which the following is a specification.

The present invention relates to camera tripods and more particularly to the type in which a weight is connected to the camera and is movably mounted upon the tripod to permit the camera to level itself automatically, an object of this invention being to provide a simple and inexpensive means of connecting the camera to the weight whereby connection to and disconnection from the tripod may be quickly and readily effected.

To these and other ends the invention consists of certain parts and combinations of parts, all of which will be hereinafter described, the novel features being pointed out in the appended claims.

In the drawings:

Figure 1 is a fragmentary sectional view through the supporting means showing the manner in which the camera securing screw extends through the ball;

Fig. 2 is a fragmentary view in side elevation with parts in section;

Fig. 3 is a detail view of the socket member of the supporting means;

Fig. 4 is a detail view of the clamping ring; and

Fig. 5 is a small view showing the tripod in side elevation with the camera mounted thereon.

The supporting means of the tripod in this instance comprises three extensible legs 1 pivoted at 2 to ears 3 which extend radially from a socket member 4. This socket member is externally threaded at 5 for engagement by a clamping ring 6 forming the clamping means. Within this socket member 4 a ball 7 is arranged, said ball having an extension 8 externally threaded and engaged by a supporting plate 9, the latter engaging with a wall 10 of a camera.

The ball 7 is provided with a diametrically extending bore which also extends through the extension 8, the extension being enlarged at 11 beneath an opening at 12 formed in the supporting plate 9. Extending through the bore of the ball is a rod 13 which has an annular enlargement 14 lying in the bore 11 and also has a screw threaded portion 15 extending through the opening 12 in the plate 9 for engagement within a screw threaded socket piece 16 in the wall 10 of the camera. The annular enlargement 14 confines the rod 13 against longitudinal axial movement but permits it to be turned so as to cause the screw portion 15 thereof to engage with and to become disengaged from the camera wall 10. The lower end of the rod 13 has a ball or weight 17 secured thereto by a set screw 18 permitting said ball or weight to be shifted longitudinally of the rod 13.

In using the tripod, the clamping collar 6 is turned to free the ball 7 so that the latter may move in the socket 4. The screw 15 is engaged with the camera wall 10 by turning the rod 13 until the camera wall is drawn firmly against the supporting plate 9. After the camera is properly secured, it is free to permit the weight 17 to level the camera. After the leveling has been completed, the ring 6 is turned in order to clamp the ball 7 firmly in the socket 4 thus securing the camera in its level condition.

From the foregoing it will be seen that the screw which secures the camera to the tripod supporting means is provided with a leveling weight and the portion of the screw between the weight and the screw portion turns in a device, in this instance, a ball which is adjustable on the supporting means to permit the screw to assume a vertical position under the action of the weight. By this arrangement the screw may be operated from the under side of the supporting means of the tripod and the camera may be brought in close proximity to the supporting means while at the same time permitting such camera to be adjusted to a level position. The construction as a whole is simple in operation and inexpensive to manufacture.

What I claim as my invention and desire to secure by Letters Patent is:—

1. A tripod comprising a supporting means, an object securing device provided with a screw portion and with a leveling weight for the object, an adjusting device in which said object securing device turns between the screw portion and the weight, but is held against axial movement, said adjusting device being adjustable on the supporting means under the action of the leveling weight to permit the screw portion to assume a vertical position.

2. A tripod comprising a supporting means having a socket and clamping means, a ball in said socket secured by said clamping means in adjusted position, and an object securing device extending through and turnable in said ball but held against axial movement relatively to the ball, said object securing device having a weight below the ball to cause the securing device to assume an upright position.

3. A tripod comprising a supporting means having a suitable socket, a ball adjustable in said socket, and an object securing device extending through the ball to the under side thereof for operation from such under side, freely rotatable in such ball and held against axial movement in the ball during such rotation.

4. A tripod comprising supporting means having a socket, a ball adjustable in the socket and provided with an abutment for engaging a wall of an object, and an object securing device extended through the ball to the under side thereof, turnable in the ball relatively to the ball and the abutment and held against axial movement in the ball during such turning movement.

LINWOOD I. GATES.

Copies of this patent may be obtained for five cents each, by addressing the "Commissioner of Patents, Washington, D. C."